(12) United States Patent
Hwang et al.

(10) Patent No.: US 9,791,745 B2
(45) Date of Patent: Oct. 17, 2017

(54) PHOTOALIGNMENT POLYIMIDE COPOLYMER AND LIQUID CRYSTAL ALIGNMENT LAYER

(71) Applicant: LG Chem, Ltd., Seoul (KR)

(72) Inventors: Seung-Yeon Hwang, Daejeon (KR); Sung-Ho Chun, Daejeon (KR); Dong-Woo Yoo, Daejeon (KR); Hyeong-Bin Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 549 days.

(21) Appl. No.: 14/010,274

(22) Filed: Aug. 26, 2013

(65) Prior Publication Data

US 2014/0072730 A1    Mar. 13, 2014

(30) Foreign Application Priority Data

Sep. 7, 2012 (KR) .................. 10-2012-0099569
Aug. 23, 2013 (KR) .................. 10-2013-0100047

(51) Int. Cl.
*G02F 1/1337* (2006.01)
*C08G 73/10* (2006.01)
(Continued)

(52) U.S. Cl.
CPC ...... *G02F 1/133723* (2013.01); *B32B 27/281* (2013.01); *B32B 2457/202* (2013.01); *C08G 73/10* (2013.01); *C08G 73/1007* (2013.01); *C08G 73/1042* (2013.01); *C08G 73/1085* (2013.01); *C08G 73/12* (2013.01);
(Continued)

(58) Field of Classification Search
CPC .......... G02F 1/133723; C08G 73/1007; C08G 73/1042; C08G 73/10; C08G 73/1085; C08G 73/12; Y10T 428/1023; Y10T 428/1005; C08J 2379/08; B32B 27/281; B32B 2457/202
See application file for complete search history.

(56) References Cited

U.S. PATENT DOCUMENTS

| 5,464,669 A | 11/1995 | Kang et al. |
| 2009/0146105 A1* | 6/2009 | Oh .................. G02F 1/133723 252/299.61 |

(Continued)

FOREIGN PATENT DOCUMENTS

| JP | 11-158278 | 6/1999 |
| JP | 4524459 B2 | 8/2010 |

(Continued)

OTHER PUBLICATIONS

Authors: "Martin Schadt et al.; Jpn. J. Appl. Phys. vol. 31 (1992) pp. 2155-2164".

(Continued)

*Primary Examiner* — Eli D Strah
(74) *Attorney, Agent, or Firm* — Dentons US LLP

(57) ABSTRACT

Disclosed therein are a photoalignment polyimide copolymer making it easier to form a liquid crystal alignment layer with excellences in alignment properties, thermal and structural stabilities, and adhesiveness to a substrate, and a liquid crystal alignment layer using the same. The photoalignment polyimide copolymer includes all the three types of repeating units each having a defined structure.

10 Claims, 1 Drawing Sheet

(51) Int. Cl.
 *C08G 73/12* (2006.01)
 *B32B 27/28* (2006.01)
(52) U.S. Cl.
 CPC ...... *C08J 2379/08* (2013.01); *Y10T 428/1005* (2015.01); *Y10T 428/1023* (2015.01)

(56) References Cited

U.S. PATENT DOCUMENTS

2012/0172541 A1 7/2012 Dong et al.
2012/0196054 A1* 8/2012 Lee .................. G02F 1/133788
 428/1.26

FOREIGN PATENT DOCUMENTS

| KR | 1020060123899 A | 12/2006 | |
| KR | 10-2009-0056926 A | 6/2009 | |
| KR | 1020120077467 A | 7/2012 | |
| WO | WO 2012/002511 A1 * | 1/2012 | ............. C08F 24/00 |

OTHER PUBLICATIONS

Authors: "Andrey Dyanduysha et al.; Jpn. J. Appl. Phys. vol. 34, 1995, pp. L1000-L1002".

* cited by examiner

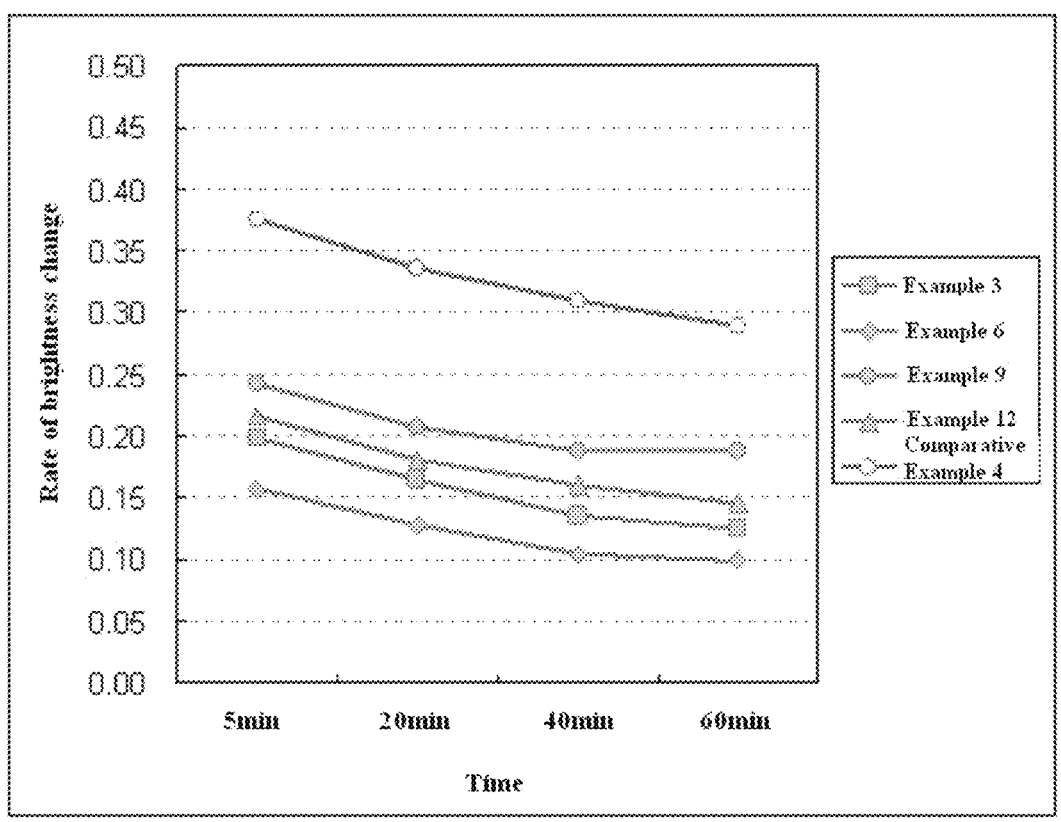

PHOTOALIGNMENT POLYIMIDE COPOLYMER AND LIQUID CRYSTAL ALIGNMENT LAYER

FIELD OF THE INVENTION

The present invention relates to a photoalignment polyimide copolymer and a liquid crystal alignment layer. More particularly, the present invention relates to a photoalignment polyimide copolymer that makes it easier to form a liquid crystal alignment layer with excellences in alignment properties, thermal and structural stabilities, and adhesiveness to a substrate, and a liquid crystal alignment layer and liquid crystal cells using the same.

BACKGROUND ART

With a recent advent of large-sized LCDs and a gradual expansion of their use from portable devices, such as mobile phones, lap-top computers, etc., to home appliances, such as wall mounted flat panel TVs, there is a demand for LCDs with high image quality, high definition and wide viewing angle. In particular, TFT-driven thin film transistor LCDs (TFT-LCDs) of which the individual pixels are independently driven are much superior in response time of liquid crystals, realizing high-quality motion pictures, and thus increasingly used in a wider range of applications.

To be used as an optical switch in the TFT-LCDs, liquid crystals are required to initially align in a defined direction on a layer including innermost TFT of the display cell. For this, a liquid crystal alignment layer is used. For the liquid crystal alignment to occur, a rubbing process has been chiefly adopted. In the rubbing process, a rubbing cloth with fine projections is moved in a defined direction along the surface of the liquid crystal alignment layer, leaving grooves in a defined direction on the surface of the liquid crystal alignment layer. Thus, liquid crystals can be aligning along the grooves.

However, the rubbing process has two problems: (1) it possibly produces static electricity between the rubbing cloth and the thin film transistor (TFT) or the color filter (CF) substrate to cause damages on the TFT; and (2) fine fibers are, in many cases, released from the rubbing cloth to lead to defectives with foreign substances, which is an obstacle to the enhancement of production yield.

To overcome these problems, there has been widely suggested a new approach using a photoalignment method to align a liquid crystal alignment layer upon exposure to a light such as UV radiation. For the photoalignment to occur, an alignment layer including a photoalignment (photosensitive) polymer is formed on the bottom of a liquid crystal layer and exposed to linearly polarized UV radiation to cause a photoreaction. As a result, photoalignment takes place to align the main chain of the photoalignment polymer in a defined direction. And, the liquid crystals contained in the liquid crystal layer are aligned by the effect of the photoaligned alignment layer.

The representative example of the photoalignment is photopolymerization-based photoalignment as disclosed by M. Schadt et al. (Jpn. J. Appl. Phys., Vol 31., 1992, 2155), Dae S. Kang et al. (U.S. Pat. No. 5,464,669), and Yuriy Reznikov (Jpn. J. Appl. Phys. Vol. 34, 1995, L1000). The photoalignment polymers used in these patent and research papers are mostly polycinnamate-based polymers, including poly(vinylcinnamate) (PVCN) or poly(vinyl methoxycinnamate) (PVMC). When the polymers are subjected to photoalignment, the double bond of cinnamate under UV radiation participates in a [2+2] cycloaddition reaction to form cyclobutane, which renders anisotropy to align liquid crystal molecules in one direction, thereby inducing alignment of the liquid crystals.

However, there is a downside to such conventional photoalignment polymers: poor structural and thermal stabilities of the main chain and unsatisfactory alignment properties. The photoalignment polymers, typically dissolved in an organic solvent, are applied to a substrate to form an alignment layer or a liquid crystal alignment layer. But, the conventional photoalignment polymers have such a low solubility to organic solvents that there is the difficulty in forming an alignment layer using them.

SUMMARY OF THE INVENTION

The present invention provides a photoalignment polyimide copolymer that makes it easier to form a liquid crystal alignment layer with excellences in alignment properties, thermal and structural stabilities, and adhesiveness to a substrate.

The present invention also provides a liquid crystal alignment layer formed by using the photoalignment polyimide copolymer, and a liquid crystal cell including the liquid crystal alignment layer.

Accordingly, the present invention provides a photoalignment polyimide copolymer comprising repeating units of the following formulas 1, 2 and 3:

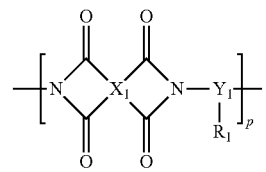

[Formula 1]

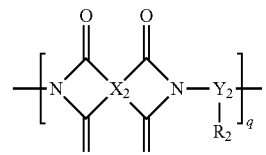

[Formula 2]

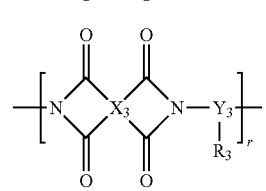

[Formula 3]

In the formulas 1, 2 and 3, each of p, q and r is independently 20 to 2,000; each of $X_1$, $X_2$ and $X_3$ is independently a quaternary organic radical derived from a cyclic acid dianhydride or an aromatic acid dianhydride; each of $Y_1$, $Y_2$ and $Y_3$ is independently a divalent organic radical derived from diamine; $R_1$ is a photoreactive functional group provided as at least one substituent to $Y_1$ and selected from the group consisting of a cinnamate-based functional group, a coumarin-based functional group, and a chalcone-based functional group; $R_2$ is an alkyl group having 8 to 30 carbon atoms or an allyl group having 8 to 30 carbon atoms and provided as at least one substituent to $Y_2$; and $R_3$ is a photocurable functional group provided as at least one substituent to $Y_3$ and selected from the group consisting of a (meth)acrylate-based functional group, a hydroxyl-containing functional group, and an epoxy-containing functional group.

The present invention further provides a liquid crystal alignment layer comprising a photoalignment layer which comprises the photoalignment polyimide copolymer or its photocured material.

The present invention further provides a liquid crystal cell comprising the liquid crystal alignment layer.

As described above, the present invention can provide a photoalignment polyimide copolymer excellent in alignment properties and thermal stability with enhanced solubility to a variety of organic solvents.

Accordingly, the present invention, using the polyimide copolymer, makes it easier to form a liquid crystal alignment layer with excellences in alignment properties, thermal and structural stabilities, and adhesiveness to a substrate.

BRIEF DESCRIPTION OF THE DRAWINGS

The FIGURE is a graph showing the rate of brightness change before and after application of stress on liquid crystal cells formed by using each of the copolymers of the examples 3, 6, 9, and 12 and the comparative example 4 in experimental example 3.

DETAILED DESCRIPTION OF THE PREFERRED EMBODIMENT

Hereinafter, a description will be given as to a photoalignment polyimide copolymer and a liquid crystal alignment layer and a liquid crystal cell using the same according to exemplary embodiments of the present invention.

In accordance with one exemplary embodiment of the present invention, there is provided a photoalignment polyimide copolymer comprising repeating units of the following formulas 1, 2 and 3:

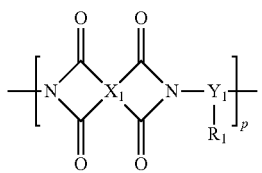

[Formula 1]

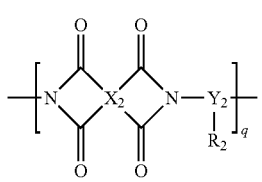

[Formula 2]

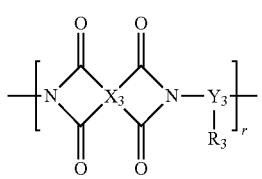

[Formula 3]

In the formulas 1, 2 and 3, each of p, q and r is independently 20 to 2,000; each of $X_1$, $X_2$ and $X_3$ is independently a quaternary organic radical derived from a cyclic acid dianhydride or an aromatic acid dianhydride; each of $Y_1$, $Y_2$ and $Y_3$ is independently a divalent organic radical derived from diamine; $R_1$ is a photoreactive functional group provided as at least one substituent to $Y_1$ and selected from the group consisting of a cinnamate-based functional group, a coumarin-based functional group, and a chalcone-based functional group; $R_2$ is an alkyl group having 8 to 30 carbon atoms or an allyl group having 8 to 30 carbon atoms and provided as at least one substituent to $Y_2$; and $R_3$ is a photocurable functional group provided as at least one substituent to $Y_3$ and selected from the group consisting of a (meth)acrylate-based functional group, a hydroxyl-containing functional group, and an epoxy-containing functional group.

The polyimide copolymer according to one exemplary embodiment may comprise all the three repeating units defined by the formulas 1, 2 and 3, respectively.

Above all, the repeating unit of the formula 1 includes a photoreactive functional group, such as a cinnamate-based functional group, a coumarin-based functional group, a chalcone-based functional group, etc. to guarantee high photoreactivity and excellent photoalignment properties for the polyimide copolymer.

The repeating unit of the formula 2 includes, at its terminal, a long-chain hydrocarbon group, such as an alkyl or allyl group having at least 8 carbon atoms, thereby securing higher solubility to various organic solvents. This makes it easier to form a photoalignment layer or a liquid crystal alignment layer using the polyimide copolymer. Further, when the polyimide copolymer is used to form a photoalignment layer or a liquid crystal alignment layer, the repeating unit of the formula 2 having a long-chain hydrocarbon group renders higher adhesiveness of the photoalignment layer to the underlying substrate.

The repeating unit of the formula 3 includes, at its terminal, a defined photocurable functional group to form a cross-link structure between the polymer chains in the UV irradiation step for photoalignment. As a result, the cross-link structure in the final photoalignment layer or liquid crystal alignment layer stabilizes the polymer matrix of the photoalignment copolymer. Further, such a cross-link structure also renders the photoalignment layer or the liquid crystal alignment layer to improve on thermal and structural stabilities and alignment stability.

In addition, the copolymer of the exemplary embodiment basically has a main chain structure of polyimide polymer and thus exhibits higher thermal and structural stabilities than the existing photoalignment polymers.

Accordingly, the photoalignment polyimide copolymer according to one exemplary embodiment makes it easier to form a liquid crystal alignment layer with excellences in alignment properties, thermal and structural stabilities, and adhesiveness to a substrate.

Hereinafter, the photoalignment polyimide copolymer will be described in further detail.

In the polyimide copolymer according to one exemplary embodiment, the photoreactive functional group $R_1$ may be selected from the group consisting of the functional groups of the following formulas 1a to 1d:

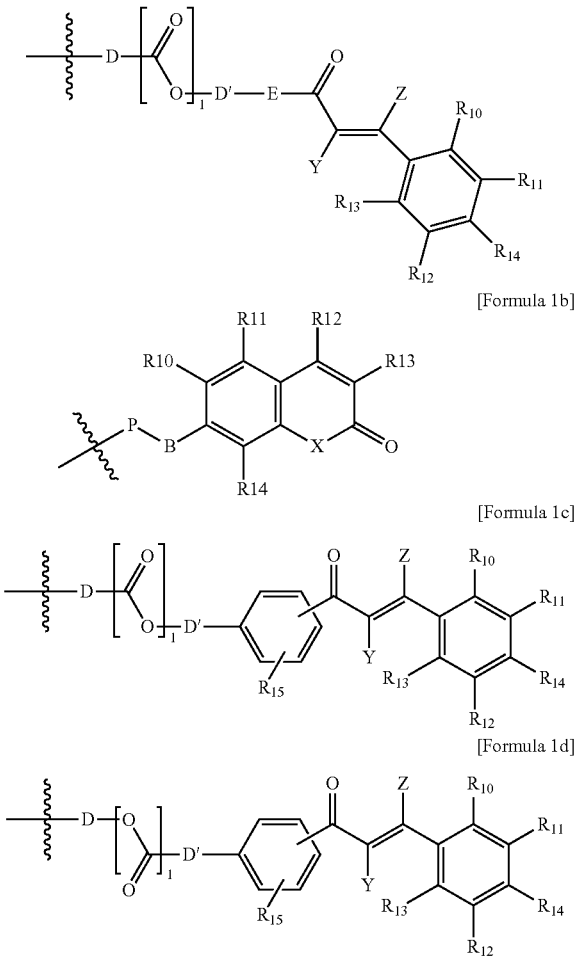

[Formula 1a]

[Formula 1b]

[Formula 1c]

[Formula 1d]

In the formulas 1a to 1d, l is 0 or 1;

B is selected from the group consisting of a chemical bond; substituted or unsubstituted alkylene having 1 to 20 carbon atoms; carbonyl; carboxy; ester; substituted or unsubstituted alkoxylene having 1 to 10 carbon atoms; substituted or unsubstituted arylene having 6 to 40 carbon atoms; and substituted or unsubstituted heteroarylene having 6 to 40 carbon atoms;

each of D and D'' is independently selected from the group consisting of a chemical bond; oxygen; substituted or unsubstituted alkylene having 1 to 20 carbon atoms; substituted or unsubstituted cycloalkylene having 3 to 12 carbon atoms; and substituted or unsubstituted alkylene oxide having 1 to 20 carbon atoms;

E is a chemical bond; substituted or unsubstituted alkylene having 1 to 20 carbon atoms; or substituted or unsubstituted arylene oxide having 6 to 40 carbon atoms;

X is oxygen or sulfur;

each of Y and Z is independently hydrogen; or substituted or unsubstituted alkyl having 1 to 20 carbon atoms;

P is selected from the group consisting of a chemical bond; substituted or unsubstituted alkylene having 1 to 20 carbon atoms; carbonyl; substituted or unsubstituted alkenylene having 2 to 20 carbon atoms; substituted or unsubstituted cycloalkylene having 3 to 12 carbon atoms; substituted or unsubstituted arylene having 6 to 40 carbon atoms; substituted or unsubstituted aralkylene having 7 to 15 carbon atoms; substituted or unsubstituted alkynylene having 2 to 20 carbon atoms; and substituted or unsubstituted cycloalkylene having 4 to 8 carbon atoms;

$R_{10}$, $R_{11}$, $R_{12}$, $R_{13}$, and $R_{14}$ are the same as or different from each other and independently selected from the group consisting of hydrogen; halogen; substituted or unsubstituted alkyl having 1 to 20 carbon atoms; substituted or unsubstituted cycloalkyl having 4 to 8 carbon atoms; substituted or unsubstituted alkoxy having 1 to 20 carbon atoms; substituted or unsubstituted aryloxy having 6 to 30 carbon atoms; substituted or unsubstituted aryl having 6 to 40 carbon atoms; substituted or unsubstituted aralkyl having 6 to 40 carbon atoms; substituted or unsubstituted heteroaryl having 6 to 40 carbon atoms and containing a hetero element in Group 14, 15 or 16; substituted or unsubstituted alkoxyaryl having 6 to 40 carbon atoms; cyano; nitrile; nitro; and hydroxy; and $R_{15}$ is provided as one or two substituents, each independently selected from the group consisting of hydrogen; halogen; cyano; substituted or unsubstituted alkyl having 1 to 20 carbon atoms; substituted or unsubstituted alkoxy having 1 to 20 carbon atoms; substituted or unsubstituted aryloxy having 6 to 30 carbon atoms; substituted or unsubstituted aryl having 6 to 40 carbon atoms; substituted or unsubstituted heteroaryl having 6 to 40 carbon atoms and containing a hetero element in Group 14, 15 or 16; and substituted or unsubstituted alkoxyaryl having 6 to 40 carbon atoms.

The polyimide copolymer according to one exemplary embodiment can improve on photoreactivity and photoalignment properties, since a cinnamate-based functional group (formula 1a), a coumarin-based functional group (formula 1 b), or a chalcone-based functional group (formula 1c or 1d) of such a specific structure is introduced into the polyimide copolymer. In such a structure of the photoreactive functional group, particularly, at least one of $R_{10}$ to $R_{14}$ may be a functional group containing a halogen such as fluorine (for example, a halogen or a halogen-substituted alkyl or aryloxy group having 1 to 20 carbon atoms) as a substituent. In this case, the polyimide copolymer can exhibit more enhanced photoreactivity and photoalignment properties. This is presumably because such functional groups with steric hindrance provide a free space between the photoreactive functional groups to enhance the photoreactivity of the individual photoreactive functional groups.

In the polyimide copolymer according to one exemplary embodiment, $X_1$, $X_2$ and $X_3$ may be a quaternary functional group derived from a cyclic acid dianhydride or an aromatic acid dianhydride. More specifically, specific examples of the acid dianhydride for $X_1$, $X_2$ and $X_3$ may include cyclic acid dianhydrides, such as 1,2,3,4-cyclobutane-tetracarboxylic acid dianhydride (CBDA), 5-(2,5-dioxotetrahydrofuryl)-3-methylcyclohexene-1,2-dicarboxylic acid dianhydride (DOCDA), bicyclooctene-2,3,5,6-tetracarboxylic acid dianhydride (BODA), 1,2,3,4-cyclopentane-tetracarboxylic acid dianhydride (CPDA), 1,2,4,5-cyclohexane-tetracarboxylic acid dianhydride (CHDA), 1,2,4-tricarboxy-3-methylcarboxy cyclopentane dianhydride, 1,2,3,4-tetracarboxycyclopentane dianhydride, etc.; or aromatic acid dianhydrides, such as pyromellitic acid dianhydride (PMDA), biphthalic acid dianhydride (BPDA), oxydiphthalic acid dianhydride (ODPA), benzophenone-tetracarboxylic acid dianhydride (BTDA), hexafluoroisopropylidenediphthalic acid dianhydride (6-FDA), etc. Of course, $X_1$, $X_2$ and $X_3$ may also be derived from other different acid dianhydrides than those mentioned above.

In the polyimide copolymer according to one exemplary embodiment, $Y_1$, $Y_2$ and $Y_3$ may be a divalent functional group derived from a diamine, such as an aromatic diamine, into which at least one of $R_1$, $R_2$ or $R_3$ is introduced. More specifically, specific examples of the diamine may include aromatic diamines, such as para-phenylenediamine (p-PDA), 4,4-methylenedianiline (MDA), 4,4-oxydianiline (ODA), meta-bisaminophenoxydiphenylsulfone (m-BAPS), para-bisaminophenoxydiphenylsulfone (p-BAPS), 2,2-bisaminophenoxyphenylpropane (BAPP), 2,2-bisaminophenoxyphenylhexafluoropropane (HF-BAPP), 1,4-diamino-2-methoxybenzene, etc. Of course, $Y_1$, $Y_2$ and $Y_3$ may also be derived from any diamine in which $R_1$, $R_2$ or $R_3$ are introduced into other different diamines.

In the polyimide copolymer according to one exemplary embodiment, $R_2$ may be an alkyl or allyl group having at least 8 carbon atoms; more appropriately, an allyl group having 8 to 30 carbon atoms with a curable functional group such as, for example, an unsaturated terminal group (e.g., vinyl group), or an alkyl group having 8 to 30 carbon atoms. The curable functional group at the terminal of $R_2$ participates in forming a cross-link structure with $R_3$ during formation of a photoalignment layer, which contributes to the enhanced stability of the photoalignment layer.

In the polyimide copolymer according to one exemplary embodiment, $R_3$ may include a photocurable functional group, such as a (meth)acrylate-based functional group, a hydroxyl-containing functional group, or an epoxy-containing functional group. Such a photocurable functional group can be any functional group (e.g., an acrylate group associated with a linker such as an acrylate group or an alkylene group) containing an acrylate group, a methacrylate group, a hydroxyl group, or an epoxy group at its terminal, so that it is photocured under UV radiation to form a cross-link structure.

In the UV-driven photoalignment process, such a photocurable functional group $R_3$ is photocured to form a cross-link structure between the polymer chains, thereby greatly enhancing the thermal and structural stabilities of the photoalignment layer or the liquid crystal alignment layer formed from the polyimide copolymer according to one exemplary embodiment.

In the polyimide copolymer according to one exemplary embodiment, the substituted or unsubstituted aryl group having 6 to 40 carbon atoms; or the substituted or unsubstituted heteroaryl group having 6 to 40 carbon atoms with a hetero element in Group 14, 15 or 16 may be selected from the group consisting of the functional groups listed below; or other different aryl or heteroaryl groups:

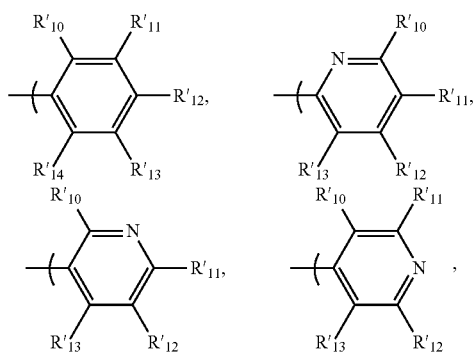

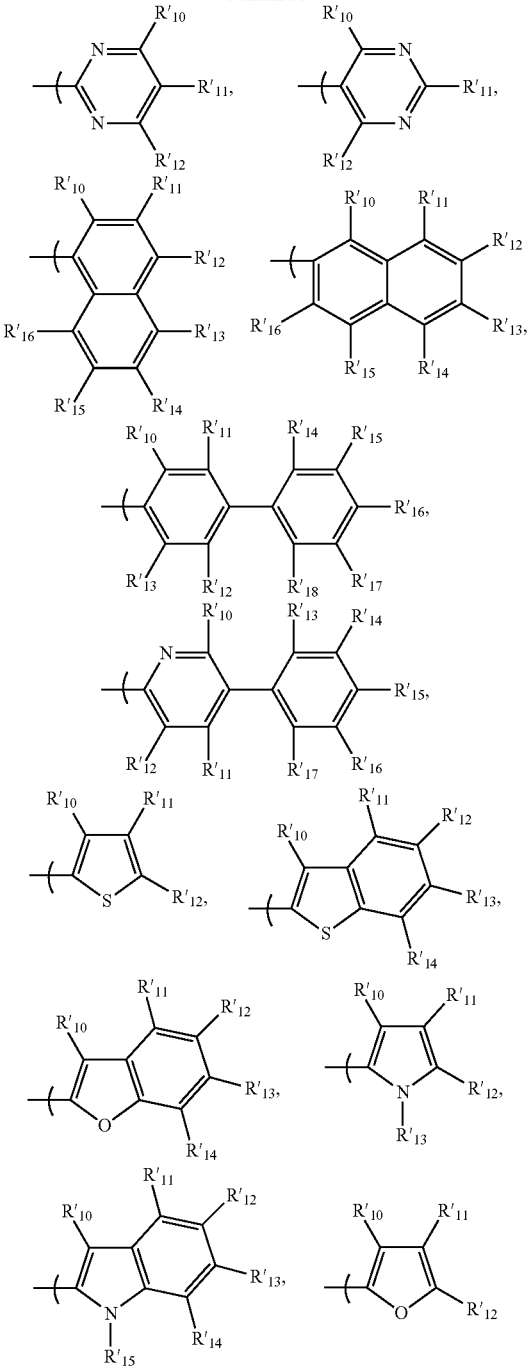

-continued

In the functional groups of these formulas, $R'_{10}$ to $R'_{18}$ are the same as or different from each other and independently selected from the group consisting of hydrogen, substituted or unsubstituted linear or branched alkyl having 1 to 20 carbon atoms, substituted or unsubstituted alkoxy having 1 to 20 carbon atoms, substituted or unsubstituted aryloxy having 6 to 30 carbon atoms, and substituted or unsubstituted aryl having 6 to 40 carbon atoms.

In the structure of the polyimide copolymer according to one exemplary embodiment, the individual substituents may be specifically defined as follows:

The term "alkyl" as used herein refers to a monovalent linear or branched saturated hydrocarbon portion having 1 to 30 carbon atoms or 1 to 20 carbon atoms. The alkyl group may also inclusively refer to substituted alkyl groups with specific substituents after-mentioned, as well as unsubstituted alkyl groups. Specific examples of the alkyl group may include methyl, ethyl, propyl, 2-propyl, n-butyl, iso-butyl, tert-butyl, pentyl, hexyl, dodecyl, fluoromethyl, difluoromethyl, trifluoromethyl, chloromethyl, dichloromethyl, trichloromethyl, iodomethyl, bromomethyl, etc.

The term "alkenyl" or "allyl" as used herein refers to a monovalent linear or branched hydrocarbon portion having 2 to 30 carbon atoms or 2 to 20 carbon atoms with at least one carbon-carbon double bond. The alkenyl group may form a bonding through carbon atoms including a carbon-carbon double bond or through saturated carbon atoms. The alkenyl group may also inclusively refer to substituted alkenyl groups with specific substituents after-mentioned, as well as unsubstituted alkenyl groups. Specific examples of the alkenyl group may include ethenyl, 1-propenyl, 2-propenyl, 2-butenyl, 3-butenyl, pentenyl, 5-hexenyl, dodecenyl, etc.

The term "cycloalkyl" as used herein refers to a monovalent saturated or unsaturated mono-, bi- or tri-cyclic non-aromatic hydrocarbon portion having 3 to 12 ring-carbon atoms. The cycloalkyl group may also inclusively refer to substituted cycloalkyl groups with specific substituents after-mentioned. Specific examples of the cycloalkyl group may include cyclopropyl, cyclobutyl, cyclopentyl, cyclopentenyl, cyclohexyl, cyclohexenyl, cycloheptyl, cyclooctyl, decahydronaphthalenyl, adamantyl, norbornyl (i.e., bicyclo[2,2,1]hept-5-enyl), etc.

The term "aryl" as used herein refers to a monovalent mono-, bi- or tri-cyclic aromatic hydrocarbon portion having 6 to 40 ring-carbon atoms or 6 to 12 ring-carbon atoms. The aryl group may also inclusively refer to substituted aryl groups with specific substituents after-mentioned. Specific examples of the aryl group may include phenyl, naphthalenyl, fluorenyl, etc.

The term "alkoxyaryl" as used herein refers to a radical in which an alkoxy group is substituted for at least one hydrogen atom of the above-defined aryl group. Specific examples of the alkoxyaryl group may include methoxyphenyl, ethoxyphenyl, propoxyphenyl, butoxyphenyl, pentoxyphenyl, hextoxyphenyl, heptoxy, octoxy, nanoxy, methoxybiphenyl, methoxynaphthalenyl, methoxyfluorenyl, methoxyanthracenyl, etc.

The term "aralkyl" as used herein refers to a radical in which an aryl group is substituted for at least one hydrogen atom of the above-defined alkyl group. The aralkyl group may also inclusively refer to substituted aralkyl groups with specific substituents after-mentioned. Specific examples of the aralkyl group may include benzyl, benzhydryl, trityl, etc.

The term "alkynyl" as used herein refers to a monovalent linear or branched hydrocarbon portion having 2 to 20 carbon atoms, preferably 2 to 10 carbon atoms, more preferably 2 to 6 carbon atoms with at least one carbon-carbon triple bond. The alkynyl group may form a bonding through carbon atoms including a carbon-carbon triple bond or through saturated carbon atoms. The alkynyl group may also inclusively refer to substituted alkynyl groups with specific substituents after-mentioned. Specific examples of the alkynyl group may include ethynyl, propynyl, etc.

The term "alkylene" as used herein refers to a divalent linear or branched saturated hydrocarbon portion having 1 to 30 carbon atoms or 1 to 20 carbon atoms. The alkylene group may also inclusively refer to substituted alkylene groups with specific substituents after-mentioned. Specific examples of the alkylene group may include methylene, ethylene, propylene, butylene, hexylene, etc.

The term "alkenylene" as used herein refers to a divalent linear or branched hydrocarbon portion having 2 to 30 carbon atoms or 2 to 20 carbon atoms with at least one carbon-carbon double bond. The alkenylene group may form a bonding through carbon atoms including a carbon-carbon double bond and/or through saturated carbon atoms. The alkenylene group may also inclusively refer to substituted alkenylene groups with specific substituents after-mentioned.

The term "cycloalkylene" as used herein refers to a divalent saturated or unsaturated mono-, bi- or tri-cyclic non-aromatic hydrocarbon portion having 3 to 12 ring-carbon atoms. The cycloalkylene group may also inclusively refer to substituted cycloalkylene groups with specific substituents after-mentioned. Specific examples of the cycloalkylene group may include cyclopropylene, cyclobutylene, etc.

The term "arylene" as used herein refers to a divalent mono-, bi- or tri-cyclic aromatic hydrocarbon portion having 6 to 20 ring-carbon atoms or 6 to 12 ring-carbon atoms. The arylene group may also inclusively refer to substituted arylene groups with specific substituents after-mentioned. The aromatic portion of the arylene group includes carbon atoms only. Specific examples of the arylene group may include phenylene, etc.

The term "aralkylene" as used herein refers to a divalent radical in which an aryl group is substituted for at least one hydrogen atom of the above-defined alkyl group. The aralkylene group may also inclusively refer to substituted aralkylene groups with specific substituents after-mentioned. Specific examples of the aralkylene group may include benzylene, etc.

The term "alkynylene" as used herein refers to a divalent linear or branched hydrocarbon portion having 2 to 20 carbon atoms or 2 to 10 carbon atoms with at least one carbon-carbon triple bond. The alkynylene group may form a bonding through carbon atoms including a carbon-carbon triple bond or through saturated carbon atoms. The alkynylene group may also inclusively refer to substituted alkynylene groups with specific substituents after-mentioned. Specific examples of the alkynylene group may include ethynylene, propynylene, etc.

In the above description, the phrase "substituted or unsubstituted" has an inclusive meaning that the substituent is substituted with the substituent itself or further substituted with another specific substituent. If not stated otherwise in this specification, the examples of the substituent used as an additional substituent for each substituent may include halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, siloxy, or "polar functional groups containing oxygen, nitrogen, phosphor, sulfur, silicon, or boron" as mentioned above.

The above-described copolymer according to one exemplary embodiment may be a copolymer comprising each one of the respective repeating units of the formulas 1, 2 and 3; or a copolymer comprising at least two of each repeating unit of the formulas 1, 2 and 3. In the case of the copolymer comprising at least two of each repeating unit of the formulas 1, 2 and 3, at least two of each $R_1$, $R_2$ or $R_3$ may be introduced into each repeating unit. With a view to achieving good alignment properties, high solubility to organic solvents, and high stability of the final photoalignment layer, the copolymer according to one exemplary embodiment may comprise all the three repeating units at a molar ratio (the repeating unit of the formula 1:the repeating unit of the formula 2:the repeating unit of the formula 3) of about 4 to 8:about 0.5 to 4:about 0.5 to 3; or about 4 to 7:about 1 to 2.5:about 1 to 2.5.

For the sake of good alignment properties, high solubility to organic solvents, and good coatability, the above-described copolymer according to one exemplary embodiment may have a weight average molecular weight of about 10,000 to 500,000; about 12,000 to 300,000; or about 50,000 to 100,000.

On the other hand, the above-described copolymer according to one exemplary embodiment may be prepared by introducing the respective functional groups $R_1$, $R_2$ and $R_3$ into the above-mentioned diamine; performing a condensation polymerization on the diamine having functional groups $R_1$, $R_2$ and $R_3$ with the above-mentioned cyclic acid dianhydride or aromatic acid dianhydride (for example, obtaining a polyamic acid copolymer through condensation polymerization of the diamine having functional groups $R_1$, $R_2$ and $R_3$ with the acid dianhydride); and then imidizing the polyamic acid copolymer.

In this regard, the specific conditions and method of the individual steps are specified in the examples after-mentioned and will not be described further in detail because they are the same as the preparation conditions and method for typical polyimide polymers.

In accordance with another exemplary embodiment of the present invention, there is provided a liquid alignment layer comprising a photoalignment layer which comprises the above-described photoalignment polyimide copolymer according to one exemplary embodiment or its photocured material. Such a liquid crystal alignment layer may further comprise a liquid crystal layer on the photoalignment layer. And, the liquid crystals contained in the liquid crystal layer may be susceptible to liquid crystal alignment by the effect of the photoalignment polyimide copolymer included in the photoalignment layer.

The photoalignment layer and the liquid crystal alignment layer may be prepared according to the composition and preparation method known in the related art, excepting that they comprise the above-described photoalignment polyimide copolymer.

For example, the photoalignment layer may be prepared by dissolving the photoalignment polyimide copolymer in an organic solvent to obtain a coating composition, applying the coating composition onto a substrate, and then exposing the coated substrate to UV radiation.

In this regard, the organic solvent as used herein may include toluene, anisole, N,N-dimethylformamide (DMF), dimethyl sulfoxide (DMSO), N,N-dimethylacetamide (DMAc), m-cresol, 1,3-dimethyl-2-imidazolidinone (DMI), NMP, cyclohexanone, cyclopentanone, propylene glycol, methylether acetate, etc. As the above-described photoalignment polyimide copolymer has high solubility to a variety of organic solvents, any of other different organic solvents can be used without limitation.

In the coating composition, the solid concentration of the photoalignment polyimide copolymer may be in the range of 1 to 20 wt %, preferably 10 to 20 wt % with a view to casting the photoalignment layer into a film, or 1 to 10 wt % with a view to casting the photoalignment layer into a thin film.

The photoalignment layer thus obtained may be formed on a substrate or a lower structure of a device, that is, under the liquid crystal layer to cause alignment of the underlying liquid crystal layer. In this regard, the substrate as used herein may include a substrate containing a cyclic polymer, a substrate containing an acryl polymer, or a substrate containing a cellulose polymer. The coating composition comprising the photoalignment polyimide copolymer may be applied onto a substrate by any of different coating methods, such as bar coating, spin coating, or blade coating, and then exposed to UV radiation to form a photoalignment layer.

Applying UV radiation causes photoalignment. In this step, polarized UV radiation in the wavelength range of about 150 to 450 nm is applied to cause alignment. The intensity of the light applied may be about 50 mJ/cm$^2$ to 10 J/cm$^2$, preferably about 500 mJ/cm$^2$ to 5 J/cm$^2$.

The polarized UV radiation may be UV radiation polarized by passing through or reflecting from (1) a polarizer using a substrate prepared by coating a transparent substrate, such as quartz glass, soda lime glass, or soda-lime-free glass, with a dielectric anisotropic material; (2) a polarizing plate with finely deposited aluminum or metal wires; or (3) a bluster polarizer using reflection of quartz glass.

The temperature in the step of applying the UV radiation is preferably the room temperature. Under circumstances, however, the UV radiation may be applied to the substrate heated at the temperature of 100° C. or below. The thickness of the final coating film obtained by the process is preferably in the range of 30 to 1,000 nm.

In the above-described UV irradiation step, the photocurable functional group included in $R_3$, selectively $R_2$ of the photoalignment polyimide copolymer may be susceptible to photocuring in addition to photoalignment. As a result, the final photoalignment layer may include the photocured material of the polyimide copolymer, and the photocured material may include a cross-linked structure having a cross-link to $R_3$ of each polymer chain.

The above-described method is applied to form a photoalignment layer and a liquid crystal alignment layer on the photoalignment layer, thereby completing a liquid crystal alignment layer according to a typical method. In this regard, the liquid crystal alignment layer may have a thickness of about 30 to 200 nm.

By including the photoalignment polyimide copolymer, the photoalignment layer and the liquid crystal alignment layer may have higher adhesiveness to a substrate and higher thermal and structural stabilities in addition to excellences in alignment properties and alignment stability.

In accordance with further another exemplary embodiment of the present invention, there is provided a liquid crystal cell comprising the above-described liquid crystal alignment layer according to one exemplary embodiment. The liquid crystal cell may comprise a substrate and a liquid crystal alignment layer formed on the substrate or the lower structure of a device. Such a liquid crystal cell may be prepared by a typical method known to those skilled in the art. For example, a photoreactive adhesive containing a ball spacer is applied to the end of the one of two glass substrates having the liquid crystal alignment layer, and the adhesive-coated glass substrate is laminated on the other glass substrate. UV radiation is applied only to the adhesive-coated portion to form the cell. Subsequently, liquid crystals are injected into the cell, which is then subjected to heat treatment to complete a liquid crystal cell.

The construction of the liquid crystal cell is the same as that of a typical liquid crystal cell, excepting that it contains the above-described polyimide copolymer, and will not be further described in detail.

In the following are set forth preferred examples of the invention for better understanding of the invention. It is to be understood that the examples are only for illustrative purposes and are not intended to limit the scope of the invention.

Preparation Example 1: Preparation of Diamine Monomer with Photoreactive Functional Group 1-1) Introduction of Photoreactive Functional Group (Cinnamate-Based Functional Group) to 3,5-Dinitrobenzyl Alcohol (DBA)

10 g (50.5 mmol) of DBA, 19.36 g (101 mmol) of N-(3-dimethylaminopropyl)-N'-ethylcarbodiimide (EDC), 1.23 g (10.1 mmol) of 4-(dimethylamino)pyridine (DMAP), and 13.05 g (101 mmol) of diisopropylethylamine (DIPEA) together with methylene chloride were put into a 2-neck round bottom flask, which was maintained in the nitrogen atmosphere. The reaction mixture was stirred at the room temperature for 10 minutes, and 7.48 g (50.5 mmol) of cinnamic acid was added to the mixture for 24-hour reaction. The reaction mixture was subjected to extraction with distilled water for about 3 times. Magnesium sulfate was added to the MC phase, and the organic phase was removed of the remaining water. A rotary evaporator was used to eliminate the solvent, and a column (including ethylacetate and hexane at a volume ratio of 1:10) was used to obtain 15.02 g of an intermediate in which a photoreactive functional group is introduced into DBA.

$^1$H-NMR(CDCl$_3$, ppm): 8.69 (s, 1H), 8.64 (s, 2H), 7.60 (d, 2H), 7.48 (d, 1H), 7340 (t, 2H), 7.33 (t, 1H), 6.31 (d, 1H), 5.16 (s, 2H), 1-2) Substitution of Amine Group for Nitro Group in DBA to Prepare Diamine Monomer 47.31 g (606.2 mmol) of sodium sulfide and 21.4 g (247.1 mmol) of sodium bicarbonate were dissolved in 100 ml of distilled water and 200 ml of methanol, and the resultant solution was stirred at the room temperature for 30 minutes. The solution was filtered to obtain the filtrate. Then, a solution prepared by dissolving 15.02 g (45.75 mol) of the intermediate obtained in the step 1-1 in 200 ml of methanol was added to the filtrate. After a reflux for 3 to 5 hours, a rotary evaporator was used to eliminate the solvent. Distilled water was added to the residue to form a precipitate, which was then filtered out to obtain white powder. The white powder was washed with water and dried out under vacuum to yield 9.79 g of a diamine monomer (DBA-1) with a photoreactive functional group (i.e., cinnamate functional group).

$^1$H-NMR(CDCl$_3$, ppm): 7.60 (d, 2H), 7.48 (d, 1H), 7.40 (t, 2H), 7.33 (t, 1H), 6.31 (d, 1H), 6.27 (s, 4H), 6.04 (s, 2H), 5.70 (s, 1H), 5.16 (s, 2H),

Preparation Example 2: Preparation of Diamine Monomer with Long-Chain Hydrocarbon Group The procedures in the steps 2-1 and 2-2 were performed in the same manner as described in the steps 1-1 and 1-2 of the preparation example 1, excepting that nonanoic acid was used instead of cinnamic acid to prepare 12.3 g of a diamine monomer (DBA-2) with a long-chain hydrocarbon group (i.e., alkyl group).

* NMR after completion of the step 2-1:
$^1$H-NMR(CDCl$_3$, ppm): 8.69 (s, 1H), 8.64 (s, 2H), 5.20 (s, 2H), 2.32 (t, 2H), 1.64-0.88 (m, 15H)
* NMR after completion of the step 2-2:
$^1$H-NMR(CDCl$_3$, ppm): 6.27 (s, 4H), 6.04 (s, 2H), 5.70 (s, 1H), 5.20 (s, 2H), 2.32 (t, 2H), 1.64-0.88 (m, 15H)

Preparation Example 3: Preparation of Diamine Monomer with Long-Chain Hydrocarbon Group The procedures in the steps 3-1 and 3-2 were performed in the same manner as described in the steps 1-1 and 1-2 of the preparation example 1, excepting that tridecanoic acid was used instead of cinnamic acid to prepare 9.1 g of a diamine monomer (DBA-3) with a long-chain hydrocarbon group (i.e., alkyl group).

* NMR after completion of the step 3-1:
$^1$H-NMR (CDCl$_3$, ppm): 8.69 (s, 1H), 2.64 (s, 2H), 5.20 (s, 2H), 2.32 (t, 2H), 1.64-0.88 (m, 23H)
* NMR after completion of the step 3-2:
$^1$H-NMR(CDCl$_3$, ppm): 6.27 (s, 4H), 6.04 (s, 2H), 5.70 (s, 1H), 5.20 (s, 2H), 2.32 (t, 2H), 1.64-0.88 (m, 23H)

Preparation Example 4: Preparation of Diamine Monomer with Photocurable Functional Group The procedures in the steps 4-1 and 4-2 were performed in the same manner as described in the steps 1-1 and 1-2 of the preparation example 1, excepting that 2-carboxyethyl acrylate was used instead of cinnamic acid to prepare 11.91 g of a diamine monomer (DBA-4) with a photocurable functional group (i.e., acrylate-based functional group).

* NMR after completion of the step 4-1:
$^1$H-NMR(CDCl$_3$, ppm): 8.69 (s, 1H), 8.64 (s, 2H), 6.27 (d, 1H), 6.05 (d, 1H), 5.59 (d, 1H), 5.20 (s, 2H), 4.54 (t, 2H), 2.53 (t, 2H)
* NMR after completion of the step 4-2:
$^1$H-NMR(CDCl$_3$, ppm) 6.27 (s, 4H), 6.04 (s, 2H), 6.27 (d, 1H), 6.05 (d, 1H), 5.59 (d, 1H), 5.70 (s, 1H), 5.20 (s, 2H), 4.54 (t, 2H), 2.53 (t, 2H)

Example 1: Preparation of Photoalignment Polyimide Copolymer 1.96 g (10 mmol) of cyclobutane-1,2,3,4-tetracarboxylic acid, 1.61 g (6 mmol) of DBA-1 obtained in the preparation example 1, 0.84 g (3 mmol) of DBA-2 obtained in the preparation example 2, and 0.26 g (1 mmol) of DBA-4 obtained in the preparation example 4 together with 46.7 g of NMP were put into a 1-neck round bottom flask. The reaction mixture was stirred at the room temperature for 12 hours under the nitrogen atmosphere to cause condensation polymerization.

The polyamic acid solution thus obtained was then subjected to a reaction in the presence of pyridine as a base catalyst and acetic acid anhydride as a dehydrating agent at 120° C. to yield a photoalignment polyimide copolymer (Refer to *Polymer Journal*, Vol. 38, No. 10, 1043-1054 (2006)).

Examples 2 to 12 and Comparative Examples 1 to 4: Preparation of Photoalignment Polyimide Copolymer The procedures were performed in the same manner as described in the example 1, excepting that the types and the mixing ratio of the individual monomers were varied as presented in Table 1 to prepare the respective photoalignment polyimide copolymers of the examples 2 to 12 and the comparative examples 1 to 4.

In the examples 7 to 12 and the comparative examples 1 to 4, CBDA was replaced by benzophenone-3,3',4,4'-tetracarboxylic acid anhydride (BTDA). The molecular weights of the respective polyimide copolymer products are presented in Table 1.

when it dissolved completely; "PS (partial soluble)" when it dissolved partially; and "I (insoluble)" when it didn't dissolve at all.

TABLE 1

| Example | Monomer | | | | Molar ratio of diamine monomers | Properties | | |
|---|---|---|---|---|---|---|---|---|
| | Acid anhydride | Diamine | | | | Mw | Mn | PDI |
| Example 1 | CBDA | DBA-1 (Preparation Example 1) | DBA-2 (Preparation Example 2) | DBA-4 (Preparation Example 4) | 5:3:2 | 17700 | 12700 | 1.39 |
| Example 2 | | DBA-1 (Preparation Example 1) | DBA-2 (Preparation Example 2) | DBA-4 (Preparation Example 4) | 6:2:2 | 16100 | 11900 | 1.35 |
| Example 3 | | DBA-1 (Preparation Example 1) | DBA-2 (Preparation Example 2) | DBA-4 (Preparation Example 4) | 7:2:1 | 16800 | 11500 | 1.46 |
| Example 4 | | DBA-1 (Preparation Example 1) | DBA-3 (Preparation Example 3) | DBA-4 (Preparation Example 4) | 5:3:2 | 17100 | 12300 | 1.39 |
| Example 5 | | DBA-1 (Preparation Example 1) | DBA-3 (Preparation Example 3) | DBA-4 (Preparation Example 4) | 6:2:2 | 17600 | 13100 | 1.34 |
| Example 6 | | DBA-1 (Preparation Example 1) | DBA-3 (Preparation Example 3) | DBA-4 (Preparation Example 4) | 7:2:1 | 15900 | 11800 | 1.35 |
| Example 7 | BTDA | DBA-1 (Preparation Example 1) | DBA-2 (Preparation Example 2) | DBA-4 (Preparation Example 4) | 5:3:2 | 13400 | 9300 | 1.44 |
| Example 8 | | DBA-1 (Preparation Example 1) | DBA-2 (Preparation Example 2) | DBA-4 (Preparation Example 4) | 6:2:2 | 16700 | 11400 | 1.46 |
| Example 9 | | DBA-1 (Preparation Example 1) | DBA-2 (Preparation Example 2) | DBA-4 (Preparation Example 4) | 7:2:1 | 15900 | 12400 | 1.28 |
| Example 10 | | DBA-1 (Preparation Example 1) | DBA-3 (Preparation Example 3) | DBA-4 (Preparation Example 4) | 5:3:2 | 15500 | 11700 | 1.53 |
| Example 11 | | DBA-1 (Preparation Example 1) | DBA-3 (Preparation Example 3) | DBA-4 (Preparation Example 4) | 6:2:2 | 16200 | 10600 | 1.23 |
| Example 12 | | DBA-1 (Preparation Example 1) | DBA-3 (Preparation Example 3) | DBA-4 (Preparation Example 4) | 7:2:1 | 14900 | 12100 | 1.36 |
| Comparative Example 1 | BTDA | DBA-1 (Preparation Example 1) | — | DBA-4 (Preparation Example 4) | 6:4 | 18700 | 13700 | 1.59 |
| Comparative Example 2 | | DBA-1 (Preparation Example 1) | — | DBA-4 (Preparation Example 4) | 7:3 | 17300 | 10900 | 1.55 |
| Comparative Example 3 | | DBA-1 (Preparation Example 1) | — | DBA-4 (Preparation Example 4) | 8:2 | 17800 | 11500 | 1.35 |
| Comparative Example 4 | | DBA-1 (Preparation Example 1) | DBA-3 (Preparation Example 3) | — | 7:3 | 16500 | 12200 | |

Experimental Example 1: Evaluation of Solubility

The respective photoalignment polyimide copolymers of the examples 1 to 12 and the comparative examples 1 to 4 were evaluated in regards to solubility according to the following method.

Firstly, 0.2 g of each copolymer was added to 1.8 g of a solvent, and the solution was shaken at the room temperature for one hour to evaluate the solubility of the copolymer to the solvent based on how much the copolymer was dissolved in the solvent. The copolymer was classified as "S (soluble)"

TABLE 2

| | NMP | DMF | DMSO | m-cresol | Cyclo-pentanone | THF |
|---|---|---|---|---|---|---|
| Example 1 | S | S | PS | S | S | PS |
| Example 2 | S | S | PS | S | S | PS |
| Example 3 | S | S | PS | S | S | PS |
| Example 4 | S | S | PS | S | PS | PS |
| Example 5 | S | S | PS | S | PS | PS |
| Example 6 | S | S | PS | S | PS | PS |
| Example 7 | S | S | S | S | S | S |
| Example 8 | S | S | S | S | S | S |
| Example 9 | S | S | PS | S | S | PS |

TABLE 2-continued

| | NMP | DMF | DMSO | m-cresol | Cyclo-pentanone | THF |
|---|---|---|---|---|---|---|
| Example 10 | S | S | PS | S | PS | S |
| Example 11 | S | S | PS | S | PS | S |
| Example 12 | S | S | S | S | PS | PS |
| Comparative Example 1 | S | PS | I | PS | I | I |
| Comparative Example 2 | S | PS | I | PS | I | I |
| Comparative Example 3 | S | PS | I | PS | I | I |

Referring to Table 2, the polyimide copolymers of the examples 1 to 12 showed much higher solubility to different solvents in comparison to those of the comparative examples.

Experimental Example 2: Evaluation of Optical Anisotropy

Each photoalignment polyimide copolymer of the examples 1 to 12 was dissolved in a solvent mixture of NMP and butyl cellosolve (volume ratio=6:4) at a ratio of 10 wt %. The resultant solution was applied onto a glass substrate by spin coating (1,400 rpm, 30 sec.) and dried out at 100° C. for 2 minutes. Then, a UV irradiator was used to apply a UV light (15 mw/cm$^2$) for 2 minutes, thereby forming a photoalignment layer. In this regard, a polarizing plate was placed before the UV lamp to cause photoalignment under polarized UV light.

The photoalignment layer thus obtained was measured in regards to vertical absorbance $A^\perp$ and horizontal absorbance $A\|$ with a UV spectrometer. For absorbance measurement, a polarizing plate was placed before the UV spectrometer to measure horizontal absorbance and vertical absorbance at wavelength of 300 nm. Using the absorbance values, the optical anisotropy was calculated according to the equation given by "Optical Anisotropy=$(A^\perp - A\|)/(A^\perp + A\|)$". The results are presented in Table 3.

TABLE 3

| | Optical Anisotropy |
|---|---|
| Example 1 | 0.0028 |
| Example 2 | 0.0033 |
| Example 3 | 0.0051 |
| Example 4 | 0.003 |
| Example 5 | 0.0034 |
| Example 6 | 0.0049 |
| Example 7 | 0.0023 |
| Example 8 | 0.0029 |
| Example 9 | 0.0037 |
| Example 10 | 0.0027 |
| Example 11 | 0.0033 |
| Example 12 | 0.0041 |

Referring to Table 3, the photoalignment layers obtained by using the respective copolymers of the examples 1 to 12 showed excellent optical anisotropy. For reference, KR2011-071599 discloses that polyvinyl cinnamate used as a copolymer in the prior art has an optical anisotropy of 0.001, which demonstrates that the copolymers of the examples 1 to 12 are superior in the optical anisotropy to the existing copolymer.

Experimental Example 3: Evaluation of Rate of Brightness Change

The alignment layer formed in the experimental example 2 was used to prepare a liquid crystal cell, which was then stressed and evaluated in regards to the brightness change after application of stress. More specifically, each of the polymers of the examples 3, 6, 9, and 12 and the comparative example 4 was used to form an alignment layer according to the method of the experimental example 2, and the alignment layer was laminated and exposed to UV radiation to cure the sealant. Then, IPS liquid crystals were injected into the cell by way of capillary action. The cell with liquid crystals was stabilized at 80° C. for 20 minutes, and a polarizing plate was adhered to the top and bottom plates of the cell in the form of a cross.

For measurement of the brightness before application of stress, the brightness was measured with a photometer while a 1V AC voltage was being applied to a liquid crystal cell. Subsequently, the liquid crystal cell was put under a stress of 5V AC voltage and 0.5V DC voltage for 6 hours. After application of the stress, a photometer was used to measure the brightness while a 1V AC voltage was being applied to the liquid crystal cell.

To examine the brightness change over time, the brightness after application of the stress was measured every 20 minutes for one hour. The rate of brightness change as a function of time was determined by subtracting the brightness L1 measured before application of the stress from the time-based brightness L2 measured after application of the stress and then dividing the difference (L2-L1) by L1 (i.e., the rate of brightness change=(L2-L1)/L1). The rate of brightness change as a function of time is as shown in the FIGURE.

Referring to the FIGURE, the liquid crystal cells using the copolymers of the examples had the higher alignment stability and hence the lower rate of brightness change after application of the stress than those using the copolymer of the comparative example. This is presumably because the photocurable functional groups in the copolymers of the examples are cured by polarized UV radiation to form a network, which stabilizes the photosensitive functional groups subjected to photoreaction or photoalignment to enhance the stability of liquid crystal alignment properties.

What is claimed is:

1. A photoalignment polyimide copolymer comprising repeating units of the following formulas 1, 2 and 3:

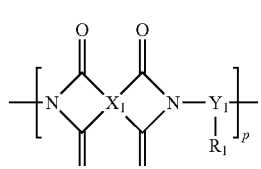

[Formula 1]

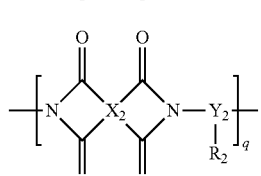

[Formula 2]

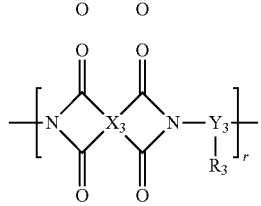

[Formula 3]

wherein each of p, q and r is independently 20 to 2,000;
each of $X_1$, $X_2$ and $X_3$ is independently a quaternary organic radical derived from a cyclic acid dianhydride or an aromatic acid dianhydride;
each of $Y_1$, $Y_2$ and $Y_3$ is independently a divalent organic radical derived from a phenylenediamine;
$R_1$ is a monovalent functional group of cinnamic acid, provided as a substituent to $Y_1$;
$R_2$ is a linear alkyl group having 8 to 30 carbon atoms provided as a substituent to $Y_2$; and
$R_3$ is a monovalent functional group of 2-carboxyethyl acrylate, provided as a substituent to $Y_3$,
wherein a molar ratio of the repeating units (the repeating unit of the formula 1:the repeating unit of the formula 2:the repeating unit of the formula 3) is 4 to 8:0.5 to 4:0.5 to 3.

2. The photoalignment polyimide copolymer as claimed in claim 1, wherein the cyclic acid dianhydride or the aromatic acid dianhydride comprises at least one selected from the group consisting of 1,2,3,4-cyclobutane-tetracarboxylic acid dianhydride (CBDA), dioxotetrahydrofuryl)-3-methylcyclohexene-1,2-dicarboxylic acid dianhydride (DOCDA), bicyclooctene-2,3,5,6-tetracarboxylic acid dianhydride (BODA), 1,2,3,4-cyclopentane-tetracarboxylic acid dianhydride (CPDA), 1,2,4,5-cyclohexane-tetracarboxylic acid dianhydride (CHDA), 1,2,4-tricarboxy-3-methylcarboxy cyclopentane dianhydride, 1,2,3,4-tetracarboxycyclopentane dianhydride, pyromellitic acid dianhydride (PMDA), biphthalic acid dianhydride (BPDA), oxydiphthalic acid dianhydride (ODPA), benzophenone-tetracarboxylic acid dianhydride (BTDA), and hexafluoroisopropylidenediphthalic acid dianhydride (6-FDA).

3. The photoalignment polyimide copolymer as claimed in claim 1, wherein the photoalignment polyimide copolymer has a weight average molecular weight of 10,000 to 500,000.

4. A liquid crystal alignment layer comprising a photoalignment layer, wherein the photoalignment layer comprises the photoalignment polyimide copolymer as claimed in claim 1 or a photocured material thereof.

5. The liquid crystal alignment layer as claimed in claim 4, further comprising a liquid crystal layer on the photoalignment layer.

6. The liquid crystal alignment layer as claimed in claim 4, wherein the photoalignment layer comprises a photocured material of the photoalignment polyimide copolymer having a photocurable functional group $R_3$ crosslinked thereto.

7. The liquid crystal alignment layer as claimed in claim 4, wherein the liquid crystal alignment layer has a thickness of 30 to 200 nm.

8. A liquid crystal cell comprising the liquid crystal alignment layer as claimed in claim 4.

9. The liquid crystal cell as claimed in claim 8, wherein the liquid crystal cell is used for IPS (In-Plane Switching) liquid crystal.

10. The liquid crystal cell as claimed in claim 8, wherein the liquid crystal cell is used for TN (Twisted-Nematic) liquid crystal.

* * * * *